United States Patent [19]

Takahashi et al.

[11] 4,054,531
[45] Oct. 18, 1977

[54] CERAMIC DIELECTRIC COMPOSITION

[75] Inventors: Koji Takahashi; Norishige Yamaguchi; Makoto Hori; Masamichi Turuta, all of Tokyo, Japan

[73] Assignee: TDK Electronics Co., Ltd., Tokyo, Japan

[21] Appl. No.: 628,229

[22] Filed: Nov. 3, 1975

[30] Foreign Application Priority Data

| Nov. 7, 1974 | Japan | 49-128452 |
| Nov. 26, 1974 | Japan | 49-136419 |
| Feb. 4, 1975 | Japan | 50-14723 |
| Sept. 5, 1975 | Japan | 50-107720 |
| Sept. 5, 1975 | Japan | 50-107721 |
| Sept. 16, 1975 | Japan | 50-111907 |

[51] Int. Cl.$^2$ .................. H01B 3/00; H01B 3/02; H01B 1/06; C04B 35/00
[52] U.S. Cl. .................. 252/63.2; 252/63.5; 252/520; 106/73.3; 106/73.31
[58] Field of Search .................. 106/73.3, 73.31; 252/520, 63.5, 63.2

[56] References Cited

U.S. PATENT DOCUMENTS

| 2,525,627 | 10/1950 | Wainer | 106/73.31 |
| 2,992,929 | 7/1961 | Clement et al. | 106/73.31 |
| 3,002,841 | 10/1961 | Goodman | 106/73.31 |
| 3,179,525 | 4/1965 | Welsby et al. | 106/73.3 |
| 3,184,660 | 5/1965 | Robinson | 252/63.5 X |
| 3,352,697 | 11/1967 | Fujiwara et al. | 106/73.3 |
| 3,373,120 | 3/1968 | Nitta et al. | 252/520 |
| 3,410,705 | 11/1968 | Honma | 106/73.31 |
| 3,869,398 | 3/1975 | Yamaoka et al. | 106/73.3 X |
| 3,899,451 | 8/1975 | Ichinose et al. | 252/520 |

FOREIGN PATENT DOCUMENTS

| 2,053,277 | 5/1972 | Germany | 252/63.5 |

Primary Examiner—Patrick P. Garvin
Assistant Examiner—William G. Wright
Attorney, Agent, or Firm—Kenyon & Kenyon

[57] ABSTRACT

A ceramic dielectric composition is provided which consists essentially of bismuth titanate with substituents, expressed by the formula:

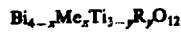

$$Bi_{4-x}Me_xTi_{3-y}R_yO_{12}$$

where R is at least one divalent metal selected from strontium, barium and lead, Me is at least one pentavalent metal selected from tantalum, niobium and antimony, and both x and y are numbers falling within the range of 0.4 to 2.0 and the ratio of x/y is within the range of 0.9 to 1.1. This composition may contain specified metal oxide additives. The ceramic dielectric composition is sintered at a relatively low temperature, and exhibits a dielectric constant having a reduced dependence upon temperature variations over a wide use range, a reduced dielectric loss, enhanced resistivity and breakdown voltage.

9 Claims, 6 Drawing Figures

CERAMIC DIELECTRIC COMPOSITION

This invention relates to a ceramic dielectric composition and more particularly to an improved ceramic dielectric composition, which is characterized by being sintered at a relatively low tempreature, i.e., approximately 900° C to approximately 1,200° C, exhibiting a dielectric constant having a reduced dependence upon temperature variations over a wide use range, a reduced dielectric loss, enhanced resistivity breakdown voltage.

Most ceramic capacitors heretofore used in the field of the electronic industry, where compactness and large capacity are required, have a composition predominantly comprised of barium titanate as a dielectric of a high dielectric constant type. These ceramic capacitors contain a minor amount of bismuth-containing oxides, such as bismuth stannate, bismuth titanate and bismuth zirconate, incorporated therein for the purpose of reducing dependence of their dielectric constants upon temperature variations. Suitable sintering temperatures of these ceramic compositions are generally 1,200° to 1,400° C.

Recently, a ceramic capacitor which is more compact and of more improved capacity and possesses a high reliability has been desired in the field including the communication industry. Thus, a capacitor of a thin ceramic film having 0.1 to 0.2 mm thickness and a ceramic laminar capacitor composed of a plurality of superinposed laminae each having a thickness of approximately 50 microns or less have been put to practical use.

However, such laminar ceramics of the known type predominantly comprised of barium titanate are not satisfactory from the following points of view. First, since suitable sintering temperatures are high, bismuth tends to vaporize upon sintering and, therefore, the dielectric bodies are distorted and have numerous voids formed therein. The resultant capacitor is poor in density and electric and dielectric properties. Second, the crystallite possesses a large grain size, e.g. 30 to 50 microns, and hence it is difficult to make very thin laminae. Third, laminar internal electrodes used in the laminar capacitor must be made of platinum or a platinum-palladium alloy and are, therefore, costly.

It is an object of the present invention to provide ceramic dielectric compositions having optimum sintering temperatures of approximately 900° to approximately 1,200° C, i.e. lower to a considerable extent than those of the known BaTiO₃-type dielectrics.

It is another object of the present invention to provide ceramic dielectric compositions having a dielectric constant of reduced dependence upon temperature variations over a broad use range.

It is still another object of the present inventionto provide ceramic capacitors of improved insulation resistance and breakdown voltage.

It is a further object of the present invention to provide ceramic dielectric composition particularly suitable for a capacitor of a compact and laminar or multilayer type.

Other objects and advantages will be apparent from the following description.

In accordance with the present invention, there is provided a ceramic dielectric composition consisting essentially of bismuth titanate with substituents, represented by the formula:

$Bi_{4-x}Me_xTi_{3-y}R_yO_{12}$ where Me is at least one divalent metal selected from the group consisting of strontium, barium and lead, R is at least one pentavalent metal selected from the group consisting of tantalum, niobium and antimony, and $x$ and $y$ are positive numbers falling within the range of 0.4 to b 2.0 and the ratio of $x/y$ is within the range of 0.9 to 1.1.

A fundamental component of the ceramic dielectric composition of the above formula is a bismuth titanate of the formula $Bi_4Ti_3O_{12}$, which is popularly known as a BiLayer type dielectric composition. The $Bi_4Ti_3O_{12}$ has heretofore been put to practical use in a combination with a barium titanate dielectric composition of the formula $BaTiO_3$, but has not been used alone because of inferiority in both ceramic and electrical characteristics. The ceramic dielectric composition of the invention is prepared by substituting partially both the bismuth and the titanium in the formula $Bi_4Ti_3O_{12}$ with at least one divalent metal selected from strontium, barium and lead and with at least one pentavalent metal selected from tantalum, niobium and antimony, respectively. The degree of substitutin defined above by positive numbers "$x$" and "$y$" is 0.4 to 2.0. The $x$ and $y$ may be varied independently, but are approximately equal to each other, i.e. the ratio of $x/y$ is within the range of 0.9 to 1.1.

The ceramic dielectric composition of the invention may contain additions in order to modify or improve some of the ceramic and electrical characteristics. The basic composition and such modified compositions will be illustrated in detail with reference to the accompanying drawings wherein.

BASIC COMPOSITION

The degrees of substitution of both x and y should be within the range of 0.4 to 2.0, preferably 0.8 to 1,4, and the ratio of $x/y$ should be within the range of 0.9 to 1.1. This is because the dielectric constant,, the dielectric loss factor and the dependence of the dielectric constant upon the temperature variations are satisfactory in the above range.

Figure 1:
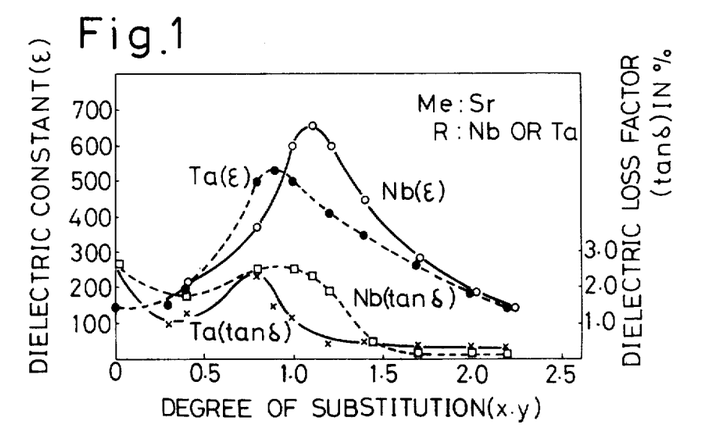
FIG. 1 is a chart illustrating the dependence of the dielectric constant and dielectric loss factor (tanδ) upon the degree of substitution of x and y in $Bi_{4-x}Me_xTi_{3-y}R_yO_{12}$.
Figure 2:
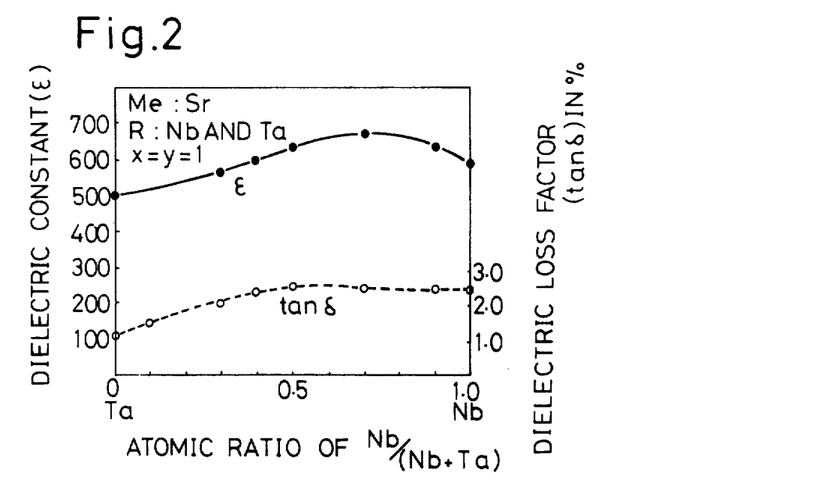
FIG. 2 is a chart illustrating the dependence of the dielectric constant and dielectric loss factor upon the atomic ratio of Nb/(Nb+Ta)

The optimum composition varies to some extent depending upon the particular substituent used. However, the dielectric constant is at a high level when x and y are 0.5 to 1.5 and reaches a peak when x and y are approximately 0.9 to 1.1, independently of the particular substituent. The dielectric loss factor is at a low level when $x$ and $y$ are larger than approximately 1.2. These are illustrated in the chart of FIG. 1, which was obtained from specimens having a substituent Sr as Me and a substituent Nb or Ta as R. One optimum composition is such that the substituent Me is strontium ($x$ = approximately 1) and the substituent R is a combination of niobium and tantalum ($y$ = approximately 1 and the atomic ratio of Nb/(Nb+Ta) equals approximately 0.5 to 1.0, particularly approximately 0.7). Such an optimum composition is illustrated in FIG. 2. It has been found that ceramic dielectric compositions wherein either one or both of the two substituents Me and R are comprised of two or more different metals are in general advantageous over the compositions wherein both substituents Me and R are comprised of a single metal. This is due to the fact that, when the amount of the substituent metal (s) is not exactly the same between lots of the ceramic dielectric composition, the electrical and dielectric characteristics of the former ceramic dielectric composition are relatively uniform between lots as compared with those of the latter ceramic dielectric composition.

The relative amount of bismuth to the divalent metal Me may not be exactly the same as "A", but may be varied within the range of approximately 0.9A to approximately 1.1A, wherein "A" is the ratio of bismuth to Me determined by the formula $Bi_{4-x}Me_xTi_{3-y}R_yO_{12}$. Similarly, the relative amount of titanium to the pentavalent metal R may not be exactly the same as "B", but may be varied within the range of approximately 0.9B to approximately 1.1B, wherein "B" is the ratio of titanium to R determined by the formula $Bi_{4-x}Me_xTi_{3-y}R_yO_{12}$. When the relative amounts of bismuth to Me and/or titanium to R are outside the above range, at least a part of the dielectric characteristics is not satisfactory.

Modified composition (1) containing at least one additive selected from oxides of Mn, Fe, Co, Ni and Cr The basic ceramic dielectric composition of the invention may contain at least one additive selected from oxides of manganese, iron, cobalt, nickel and chromium. The amount of the respective metal oxides is less than 0.5% by weight based on the weight of the basic ceramic dielectric composition and expressed in terms of manganess dioxide ($MnO_2$), ferric oxide ($Fe_2O_3$), cobaltous oxide (CoO), nickelous oxide (NiO) and chromic oxide ($Cr_2O_3$), respectively.

Figure 3:
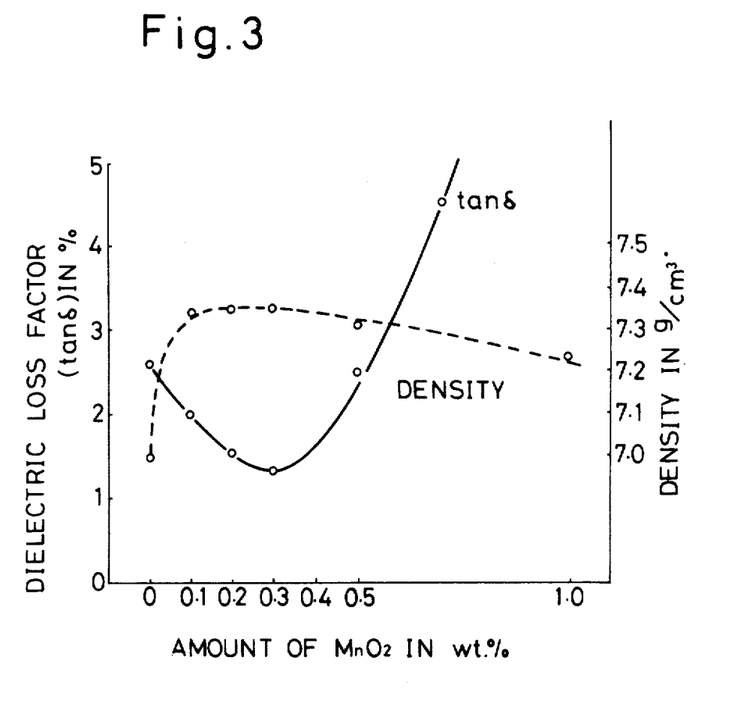
FIG. 3 is a chart illustrating the dependence of the dielectric loss factor and density upon the amount of a manganese oxide addition.

Such a modified composition is advantageous from the following points of view over the basic composition. First, the optimum sintering temperature of the modified composition is approximately 50° C lower, and the sintered ceramic body is of a larger density, as compared with the basic composition. Second, both the dielectric loss factor and dependence of the dielectric constant upon variations of temperature are lower than the basic composition. The resistivity and dielectric constant of the modified composition are approximately similar to those of the basic composition. The effect of the additive metal oxide upon the enhancement of density and the reduction of dielectric loss factor (tan δ) is illustrated in FIG. 3. It has been found that, although the modified composition is advantageous in some characteristics, as set forth above, over the basic composition, the modified composition possesses a crystalline structure and Curie point both similar to those of the basic composition.

In order for at least a small amount of benefit to be obtained, only a very small amount of the additive metal oxide needs to be incorporated in the composition. However, generally, for most uses at least 0.01% by weight expressed in terms of the metal oxides hereinbefore set forth should preferably be incorporated. The upper limit is 0.5% by weight because, when the amount of the additive metal oxide exceeds 0.5% by weight, the composition becomes inferior in dielectric loss factor and resistivity. For optimum results, it is preferred that the amount of the additive metal oxide is within the range of 0.1 to 0.4% by weight, particularly 0.2 to 0.3% by weight.

Modified composition (2) containing at least one additive selected from oxides of W and Mo The basic ceramic dielectric composition of the invention may contain at least one additive selected from tungsten oxide and molybdenum oxide. The amount of the respective metal oxides is less than 2.0 by weight based on the weight of the basic ceramic dielectric composition and expressed in terms of the amount of tungsten trioxide ($WO_3$) and molybdenum trioxide ($MoO_3$), respectively.

Such a modified composition is advantageous over the basic composition in resistivity, durability of insulation resistance under load conditions and sintering characteristic. It is presumed that these advantages are due to the following reasons. During the solid phase reaction in the step of sintering the metal oxide mixture, an intermediate product of bismuth trioxide and molybdenum trioxide or tungsten trioxide forms a liquid phase and, therefore, the sintered product is more dense and of a finer crystallite. Further, impurities such as sodium ion ($Na^{1+}$) which are inevitably contained in metal oxide raw materials and have a bad influence upon the electrical conductivity, are combined with molybdenum ion and/or tungsten ion and said combination is substituted for parts of bismuth ion ($Bi^{3+}$) and titanium ion ($Ti^{4+}$).

In order to obtain at least a small amount of benefit, only a very small amount of molybdenum oxide or tungsten oxide should be present in the composition. However, at least 0.01% by weight, expressed in terms of molybdenum trioxide ($MoO_3$) and tungsten trioxide ($WO_3$), respectively, should preferably be present. When the amount of molybdenum oxide or tungsten oxide is in excess of 0.5%, the increase of the benefit brought about by the incorporation of the additive becomes slow, and, when said amount exceeds approximately 2.0% by weight, other electrical characteristics becomes poor. Therefore, the upper limit is 2.0% by weight. For optimum results, said amount of the additive is within the range of 0.01% of 0.5% by weight.

Modified composition (3) containing lead titanate

The basic ceramic dielectric composition of the invention may contain lead titanate in an amount of 0.1 to 10.0 moles, preferably 0.1 to 2.5 moles, per mole of the basic ceramic dielectric composition expressed by the formula $Bi_{4-x}Me_xTi_{3-y}R_yO_{12}$.

Such a modified composition is advantageous in the following points of view over the basic composition. First, the optimum sintering temperature is 950° to 1,100° C, i.e., approximately 100° to 150° C lower than that of the basic ceramic dielectric composition. Second, dielectric constant is high. For example, dielectric constant of a Bi-Layertype ceramic dielectric composi- tion, e.g. in the order of approximately 140, increases to the range of approximately 200 to 680 due to the substitution with at least one additive of Sr, Ba and Pb and at least one additive of Ta, Nb and Sb, and; further, increases to the range of 230 to 860 due to the further addition of lead titanate. Third, dielectric loss is low. The dielectric loss factor (tan δ) is below 2.5%, and particularly below approximately 1.0% when the amount of lead titanate is 1.0 to 2.0 moles per mole of the basic composition. Fourth, the dependence of the dielectric constant upon the temperature variations is only to a very slight extent. The coefficient of the dielectric constant dependence upon temperature variations ($\epsilon_r.TC$) is usually within the range of +2% − +15% over the temperature variations spanning from −55° to +125° C. The dependence of the dielectric constant upon temperature variations, which is abbreviated as "ε 3. TC", is herein expressed in terms of the range of the capacity deviation percentage as defined as follows.

$$\epsilon_s \cdot TC = \frac{C_{max} - C_{25°C}}{C_{25°C}} \times 100 \, (\%) \sim \frac{C_{min} - C_{25°C}}{C_{25°C}} \times 100 \, (\%)$$

where $C_{25°C}$ is capacity as measured at 25° C, and $C_{max}$ and $C_{min}$ are the maximum capacity and the minimum capacity, respectively, as measured within the temperature range spanning from −55° to +125° C.

Figure 4:
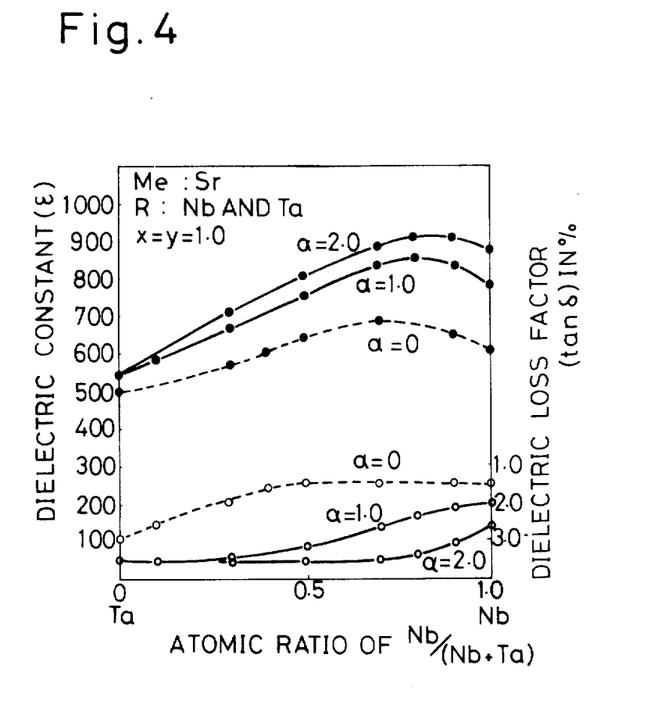
FIG. 4 is a chart illustrating the dependence of the dielectric constant and dielectric loss factor upon the amount of a PbTio₃ addition and the atomic ratio of Nb/(Nb+Ta)

The effect of lead titanate upon the enhancement of dielectric constant and the reduction of dielectric loss factor (tan δ) is illustrated in FIG. 4. The data shown in FIG. 4 were obtained on the compositions which contain strontium as Me ($x = 1.0$) and niobium and tantalum as R ($y = 1.0$) and PbTiO$_3$. Alpha indicates a mole number of PbTiO$_3$ added per mole of the basic composition. As illustrated in FIG. 4, the dielectric constant is at a high level due to the incorporation of PbTiO$_3$, particularly when the atomic ratio of Nb/(Nb+Ta) is approximately 0.3 to 1.0. Further, the dielectric loss is remarkably reduced by the combination of PbTiO$_3$.

It has been confirmed by X-ray diffractometry that, when lead titanate is combined in the basic ceramic dielectric composition in an amount such that the mole ratio of lead titanate to the basic composition of the formula Bi$_{4-x}$Me$_x$Ti$_{3-y}$R$_y$O$_{12}$ is an integer such as 1 or 2, the resulting modified ceramic dielectric composition is of a Bi-Layer structure as follows.

and

When the mole ratio of lead titanate to the basic composition of the aforesaid formula is not an integer, i.e. the proportion of the two compounds is not so chemically stoichiometric as to form a Bi-Layer structure, the resulting composition is in the form of a mixed crystal composed of a Bi-Layer type structure portion and lead titanate. However, the modified ceramic dielectric composition possesses satisfactory characteristics independent of the type of the crystalline structure.

Modified composition (4) containing lead titanate and at least one additive selected from molybdenum oxide and tungsten oxide The additives used in the preparation of the modified ceramic dielectric compositions (1) through (3), illustrated above, may be incorporated in the basic ceramic dielectric composition in combination with two or more of the additives in order to achieve the combined effects.

One preferred composition consists essentially of; (1) bismuth titanate with substituents, represented by the formula, Bi$_{4-x}$Me$_x$Ti$_{3-y}$R$_y$O$_{12}$; (2) lead titanate in an amount of 0.1 to 10 moles per mole of the aforesaid basic component (1), and; (3) tungsten oxide and/or molybdenum oxide in an amount of 0.01 to 2.0% by weight based on the weight of the aforesaid basic component and expressed in terms of the weight of tungsten trioxide (WO$_3$) and molybdenum trioxide (MoO$_3$), respectively. This preferred composition has the advantages of both of the modified compositions (2) and (3) herein before set forth. That is, this preferred composition exhibits a high dielectric constant, a reduced dielectric loss, reduced dependence of the dielectric constant upon the temperature variations, improved sintering characteristics, a high resistivity and a high breakdown voltage.

Figure 5:
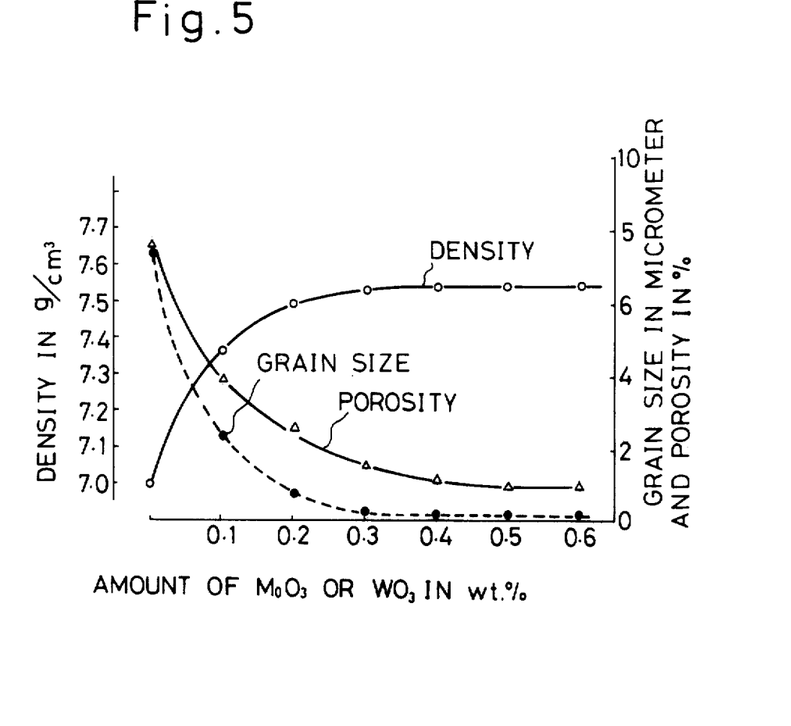
FIG. 5 is a chart illustrating the dependence of the density, crystallite size and porosity upon the amount of an addition MoO₃ or WO₃.

The effect of molybdenum oxide and/or tungsten oxide upon the enhancement of sintering characteristics is illustrated in FIG. 5. The data shown in FIG. 5 were obtained from the compositions consisting of a Bi-Layer type structure of the formula, PbBi$_3$SrTi$_3$(Nb$_{0.5}$Ta$_{0.5}$)O$_{15}$, and molybdenum trioxide or tungsten trioxide. As illustrated in FIG. 5, porosity, grain size and density reach satisfactory levels upon the addition of approximately 0.01% by weight of MoO$_3$ or WO$_3$, but become approximately constant when the amount of MoO$_3$ or WO$_3$ added reaches 0.5% by weight. When the amount of MoO$_3$ or WO$_3$ added exceeds 2.0% by weight, other characteristics become poor.

The ceramic dielectric compositions of the present invention may be prepared as follows. Finely divided particles or powders of the respective metal oxides are blended with each other and shaped into a suitable form such as tablets. The shaped product is pre-sintered at a temperature of 500° to 1,000° C for 0.5 to 5 hours. The pre-sintered product is pulverized into fine particles or powders and shaped into a suitable form using or not using a binder. Then, the shaped product is sintered at a temperature of 900° to 1,200° C for 0.5 to 8 hours. If desired, the aforesaid pre-sintering and the subsequent pulverization may be repeated prior to the sintering.

Instead of metal oxides, the respective metal compounds may be used which are in the form of carbonate salts, organic acid salts and hydroxides.

The advantages of the ceramic dielectric composition of the invention is summarized as follows. First, the optimum sintering temperature is lower than those of known BaTiO$_3$-type ceramic dielectrics, and the sintered ceramic composition exhibits improved ceramic characteristics over known BaTiO$_3$-type ceramic dielectrics. Second, both breakdown voltage and insulation resistance are high, and the load-durability of the insulation resistance at a high temperature is good.

Therefore, the ceramic dielectric composition is dense and capable of being made thin, e.g. approximately 50 microns or less, and hence is particularly suitable for capacitors of a compact-type with a large capacity such as film-type capacitors or laminar capacitors. In such laminar capacitors, the internal electrode may be composed of moderate noble metals, such as a silver-palladium alloy, because of the low sintering temperature. That is, although expensive noble metals such as platinum and a platinum-palladium alloy must be used in known $BaTiO_3$-type ceramic laminar capacitors, silver-palladium alloys containing up to approximately 90% by weight of silver may be used in laminar capacitors of the ceramic dielectrics of the invention. The thickness of the ceramic of the laminar capacitors may be lowered to approximately 20 microns, which thickness corresponds to a half to one third of the thickness of the known $BaTiO_3$-type ceramic layers.

Further, the ceramic dielectric composition of the invention exhibits a reduced dependence of the dielectric constant upon temperature variations over a wide use range and a reduced dielectric loss.

Although the ceramic dielectric composition of the invention possesses a low dielectric constant, usually approximately 200 to 800, it is not inferior in dielectric characteristics to known $BaTiO_3$-type ceramic dielectrics which possess a dielectric constant of approximately 600 to 2,040. This is because the ceramic dielectric of the invention can be made thin, as set forth above, and has improved reliability.

The invention is further disclosed in the following examples, which are illustrative but not limitative thereof. In the examples, percentages are by weight unless otherwise specified and asterisked data in each Table are comparative examples.

EXAMPLE 1

This example illustrates the basic ceramic dielectric composition.

Using finely divided powders of bismuth trioxide ($Bi_2O_3$), titanium dioxide ($TiO_2$), strontium carbonate ($SrCO_3$), barium carbonate ($BaCO_3$), lead monooxide (PbO), tantalum pentoxide ($Ta_2O_5$), niobium pentoxide ($Nb_2O_5$) and antimony pentoxide ($Sb_2O_5$), various ceramic dielectric compositions were prepared as follows.

The respective finely divided metal oxide or carbonate powders are blended with each other and shaped into tablets. The tablets were presintered at 800° C for 2 hours. The presintered tablets were pulverized into powders having a particle size of several microns by using a ball mill. After a binder was added to the powders, the powders were press-formed into discs having a diameter of 15 mm and a thickness of 1.0 mm. The discs were sintered at a temperature of 1,000° to 1,200° C for a period of 1 to 2 hours in an air atmosphere. Each disc was plated with a silver electrode, and its electrical and dielectric characteristics were tested. Results are shown in Table I.

Table I

| Specimen No. | $x=y$ | $M_e$ | R | Dielectric constant $\epsilon_s$ | tan δ (%) | Resistivity (ohm cm) | $\epsilon_s \cdot TC$ (%) ($-55 \sim 125°$ C) | | Sintering temperature (° C) |
|---|---|---|---|---|---|---|---|---|---|
| 1* | 0 | — | — | 140 | 2.6 | $2 \times 10^{11}$ | +20 | −10 | 1200 |
| 2* | 0.3 | Sr | Ta | 150 | 0.9 | $9 \times 10^{12}$ | +15 | − 7 | 1200 |
| 3 | 0.4 | " | " | 200 | 1.2 | $3 \times 10^{13}$ | +12 | − 6 | 1100 |
| 4 | 0.8 | " | " | 500 | 2.4 | $3 \times 10^{13}$ | +10 | − 6 | 1100 |
| 5 | 0.9 | " | " | 530 | 1.4 | $5 \times 10^{13}$ | + 9 | − 6 | 1100 |
| 6 | 1.0 | " | " | 500 | 1.1 | $9 \times 10^{13}$ | + 2 | − 8 | 1100 |
| 7 | 1.2 | " | " | 410 | 0.4 | $2 \times 10^{14}$ | + 6 | − 8 | 1100 |
| 8 | 1.4 | " | " | 350 | 0.4 | $7 \times 10^{13}$ | + 2 | − 6 | 1100 |
| 9 | 1.7 | " | " | 270 | 0.3 | $5 \times 10^{13}$ | + 0 | − 6 | 1130 |
| 10 | 2.0 | " | " | 180 | 0.3 | $9 \times 10^{12}$ | + 1 | − 8 | 1130 |
| 11* | 2.2 | " | " | 140 | 0.3 | $4 \times 10^{12}$ | + 5 | −10 | 1130 |
| 12 | 0.4 | Sr | Nb | 210 | 1.8 | $5 \times 10^{13}$ | +16 | −16 | 1100 |
| 13 | 0.8 | " | " | 370 | 2.5 | $2 \times 10^{13}$ | — | — | 1100 |
| 14 | 1.0 | " | " | 600 | 2.5 | $4 \times 10^{13}$ | — | — | 1100 |
| 15 | 1.1 | " | " | 654 | 2.3 | $2 \times 10^{13}$ | + 6 | −15 | 1100 |
| 16 | 1.2 | " | " | 600 | 1.9 | $5 \times 10^{13}$ | + 2 | −11 | 1100 |
| 17 | 1.4 | " | " | 450 | 0.4 | $2 \times 10^{14}$ | + 0 | −10 | 1100 |
| 18 | 1.7 | " | " | 280 | 0.1 | $1 \times 10^{14}$ | + 4 | −10 | 1100 |
| 19 | 2.0 | " | " | 187 | 0.1 | $8 \times 10^{13}$ | + 3 | − 3 | 1100 |
| 20* | 2.2 | " | " | 140 | 0.1 | $4 \times 10^{13}$ | + 6 | −10 | 1100 |
| 21 | 0.8 | Sr | (Nb 0.5 / Ta 0.5) | 570 | 2.0 | $5 \times 10^{13}$ | + 4 | −10 | 1100 |
| 22 | 0.9 | Sr | " | 560 | 2.5 | $2 \times 10^{13}$ | +15 | −12 | 1100 |
| 23 | 1.0 | Sr | (Nb 0.9 / Ta 0.1) | 640 | 2.5 | $2 \times 10^{13}$ | +16 | −15 | 1100 |
| 24 | 1.0 | Sr | (Nb 0.7 / Ta 0.3) | 680 | 2.5 | $5 \times 10^{13}$ | +10 | −15 | 1100 |
| 25 | 1.0 | Sr | (Nb 0.5 / Ta 0.5) | 640 | 2.6 | $2 \times 10^{15}$ | + 4 | −15 | 1100 |
| 26 | 1.0 | Sr | (Nb 0.4 / Ta 0.6) | 600 | 2.41 | $1 \times 10^{15}$ | + 3 | −12 | 1100 |
| 27 | 1.0 | Sr | (Nb 0.3 / Ta 0.7) | 570 | 2.03 | $3 \times 10^{15}$ | + 1 | −11 | 1100 |
| 28 | 1.0 | Sr | (Nb 0.1 / Ta 0.9) | 550 | 1.5 | $5 \times 10^{14}$ | + 0 | − 8 | 1100 |
| 29 | 1.1 | Sr | (Nb 0.5 / Ta 0.5) | 540 | 2.2 | $5 \times 10^{13}$ | + 0 | − 3 | 1100 |
| 30 | 1.4 | " | " | 410 | 0.3 | $3 \times 10^{14}$ | + 3 | − 8 | 1100 |
| 31 | 1.7 | " | " | 290 | 0.2 | $4 \times 10^{14}$ | + 1 | − 2 | 1100 |
| 32 | 1.0 | Pb | " | 540 | 2.03 | $7 \times 10^{13}$ | + 2 | −12 | 1070 |
| 33 | 1.0 | Ba Sr 0.5 | " | 550 | 2.24 | $4 \times 10^{13}$ | + 2 | −13 | 1100 |

Table I-continued

| Specimen No. | x=y | M$_c$ | R | Dielectric constant $\epsilon_s$ | tan δ (%) | Resistivity (ohm cm) | $\epsilon_s \cdot$ TC (%) (−55~125° C) | | Sintering temperature (° C) |
|---|---|---|---|---|---|---|---|---|---|
| 34 | 1.0 | Pb 0.5 | " | 530 | 2.11 | 7×10$^{14}$ | + 0 | −12 | 1070 |
| 35 | 1.0 | " | " | 620 | 2.20 | 5×10$^{14}$ | + 2 | −13 | 1100 |
| 36 | 1.0 | " | " | 640 | 2.04 | 4×10$^{14}$ | + 1 | −14 | 1070 |
| 37 | 1.0 | Sr | Nb 0.5 / Sb 0.5 | 620 | 2.00 | 8×10$^{14}$ | + 1 | − 6 | 1100 |
| 38 | 1.0 | Pb | " | 630 | 2.02 | 4×10$^{14}$ | + 0 | − 8 | 1070 |
| 39 | 1.0 | Ba | " | 630 | 2.03 | 4×10$^{14}$ | + 2 | −12 | 1100 |

EXAMPLE 2

This example illustrates electrical characteristics of laminar capacitors manufactured from the basic ceramic dielectric composition.

Layers of a basic ceramic dielectric composition of the formula, $Bi_3SrTi_2(Nb_{0.4}Ta_{0.6})O_{12}$, prepared by the procedure set forth in Example 1, and of an internal electrode paste, the effective metal component of which was composed of 70% of silver and 30% of palladium, were superinposed alternately to form two types of laminates. The laminates were pre-sintered at 700° C in an oxidative atmosphere, to burn out the organic materials, and then sintered at 1,100° C for 2 hours. Each ceramic composition layer in the two types of laminates was 20 microns and 50 microns, as measured after the sintering. The laminates were fitted with external electrodes to form laminar capacitors. The laminar capacitors were tested for their insulation resistance and DC breakdown voltage ($V_{BD}$). Results are shown in Table II.

For comparison purposes, two known laminar capacitors were prepared, one of which was from a crystalline glass dielectric and a gold internal electrode, and another of which was from a $BaTiO_3$-type ceramic dielectric and an internal electrode composed of 70% of platinum and 30% of palladium, by the procedure set forth above. The two laminar capacitors were similarly tested for their electrical characteristics. Results were shown in Table II.

As seen from Table II, a laminar capacitor prepared from the ceramic dielectric composition of the invention exhibits DC breakdown voltages ten times and five times as large as those of known laminar capacitors when the ceramics are of 50 micron thickness and of 20 micron thickness, respectively. Further, it exhibits an insulation resistance larger than those of known capacitors even when the ceramics are of 20 micron thickness.

Further, it was proved that the dependence of the electrostatic capacity upon the temperature variations was only from +3% to −12% over the temperature range from −55° to +125° C. This is similar to $\epsilon_s$·TC shown in Table I.

Although platinum or a platinum-palladium alloy had to be used as the internal electrode in a known ceramic laminar capacitor, it was proved that silver alloys composed of at most 90% of silver and at least 10% of platinum or palladium might be advantageously used in ceramic laminar capacitors prepared from the dielectric composition of the invention.

EXAMPLE 3

This example illustrates the modified ceramic dielectric composition (1).

Using finely divided powders of bismuth trioxide ($Bi_2O_3$), titanium dioxide ($TiO_2$), strontium carbonate ($SrCO_3$), barium carbonate ($BaCO_3$), lead monoxide (PbO), tantalum pentoxide ($Ta_2O_5$), antimony pentoxide ($Sb_2O_5$), manganese dioxide ($MnO_2$), ferric oxide ($Fe_2O_3$), cobaltous oxide (CoO), nickelous oxide (NiO) and chromium trioxide ($Cr_2O_3$), various ceramic dielectric compositions were prepared and tested for their electrical and dielectric characteristics, in a manner similar to that set forth in Example 1. Results are shown in Table III.

Table II

| Thickness of ceramics dielectric materials Characteristics | 50 microns | | 20 microns | | Composition of electrode | Sintering temperature (° C) |
|---|---|---|---|---|---|---|
| | Insulation resistance (ohm) | $V_{BD}$ (V) | Insulation resistance (ohm) | $V_{BD}$ (V) | | |
| $Bi_3SrTi_2(Nb_{0.4}Ta_{0.6})O_{12}$ ceramics | 3×10$^{13}$ | 3,700 | 7×10$^{12}$ | 1,200 | Ag:70 Pd:30 | 1,100 |
| Crystalline glass * | 1.4×10$^{11}$ | 300 | — | — | Au | 1,000 |
| $BaTiO_3$-type * ceramics | 1.0×10$^{10}$ | 200 | — | — | Pt:70 Pd:30 | 1,370 |

Note: * Comparative specimens

Table III

| Specimen No. | x=y | Me$^{2+}$ | Me$^{5+}$ | Additive and its amount | | Dielectric constant $\epsilon_s$ | tan δ (%) | Resistivity (ohm.cm) | $\epsilon \cdot$ TC (%) | | Sintering temperature (° C) |
|---|---|---|---|---|---|---|---|---|---|---|---|
| 25 | 1.0 | Sr | Nb 0.5 / Ta 0.5 | — | 0 | 640 | 2.6 | 2×10$^{15}$ | + 4 | −15 | 1100 |
| 40 | 1.0 | " | " | $MnO_2$ | 0.1 | 630 | 2.0 | 4×10$^{15}$ | + 4 | −13 | 1100 |
| 41 | 1.0 | " | " | " | 0.2 | 630 | 1.5 | 5×10$^{15}$ | + 4 | −11 | 1060 |
| 42 | 1.0 | " | " | " | 0.3 | 620 | 1.3 | 3×10$^{15}$ | + 4 | −10 | 1060 |
| 43 | 1.0 | " | " | " | 0.5 | 620 | 2.5 | 1×10$^{15}$ | + 4 | −14 | 1050 |
| 44* | 1.0 | " | " | " | 0.7 | 605 | 4.5 | 3×10$^{12}$ | — | — | 1050 |

Table III-continued

| Specimen No. | x=y | Me$^{2+}$ | Me$^{5+}$ | Additive and its amount | | Dielectric constant $\epsilon_s$ | tan δ (%) | Resistivity (ohm.cm) | $\epsilon \cdot$ TC | (%) | Sintering temperature (°C) |
|---|---|---|---|---|---|---|---|---|---|---|---|
| 45 | 1.0 | " | " | Fe$_2$O$_3$ | 0.2 | 625 | 1.5 | 4×10$^{15}$ | +4 | −11 | 1060 |
| 46 | 1.0 | " | " | CoO | 0.2 | 630 | 1.4 | 5×10$^{15}$ | +4 | −11 | 1060 |
| 47 | 1.0 | " | " | NiO | 0.2 | 630 | 1.4 | 3×10$^{15}$ | +4 | −10 | 1060 |
| 48 | 1.0 | " | " | Cr$_2$O$_3$ | 0.2 | 630 | 1.5 | 4×10$^{15}$ | +4 | −11 | 1060 |
| 49 | 1.0 | Sr | (Nb 0.5, Ta 0.5) | (MnO$_2$ 0.1, Fe$_2$O$_3$ 0.1) | | 625 | 1.5 | 4×10$^{15}$ | +4 | −10 | 1060 |
| 50 | 1.0 | " | " | (MnO$_2$ 0.1, CoO 0.1) | | 630 | 1.4 | 3×10$^{15}$ | +4 | −11 | 1060 |
| 51 | 1.0 | " | " | (MnO$_2$ 0.1, NiO 0.1) | | 630 | 1.4 | 5×10$^{15}$ | +4 | −11 | 1060 |
| 52 | 1.0 | " | " | (MnO$_2$ 0.1, CoO 0.1) | | 630 | 1.4 | 4×10$^{15}$ | +4 | −11 | 1060 |
| 53 | 1.0 | " | " | (Cr$_2$O$_3$ 0.1, NiO 0.1) | | 630 | 1.4 | 5×10$^{15}$ | +4 | −11 | 1060 |
| 3 | 0.4 | Sr | Ta | — | 0 | 200 | 1.2 | 3×10$^{13}$ | +12 | −6 | 1100 |
| 54 | 0.4 | " | " | MnO$_2$ | 0.2 | 200 | 0.2 | 2×10$^{13}$ | +12 | −6 | 1050 |
| 6 | 1.0 | " | " | — | 0 | 500 | 1.1 | 9×10$^{13}$ | +2 | −8 | 1100 |
| 55 | 1.0 | " | " | MnO$_2$ | 0.2 | 498 | 0.2 | 1×10$^{14}$ | +2 | −8 | 1050 |
| 10 | 2.0 | " | " | — | 0 | 180 | 0.3 | 9×10$^{12}$ | +1 | −8 | 1130 |
| 56 | 2.0 | " | " | MnO$_2$ | 0.2 | 180 | 0.07 | 3×10$^{13}$ | +1 | −8 | 1050 |
| 14 | 1.0 | Sr | Nb | — | 0 | 600 | 2.5 | 4×10$^{13}$ | — | — | 1100 |
| 57 | 1.0 | " | " | MnO$_2$ | 0.2 | 600 | 1.2 | 5×10$^{13}$ | +14 | −15 | 1050 |
| 19 | 2.0 | " | " | — | 0 | 187 | 0.1 | 8×10$^{13}$ | +3 | −3 | 1100 |
| 58 | 2.0 | " | " | MnO$_2$ | 0.2 | 185 | 0.05 | 1×10$^{14}$ | +3 | −3 | 1050 |
| 32 | 1.0 | Pb | (Nb 0.5, Ta 0.5) | — | 0 | 540 | 2.03 | 7×10$^{13}$ | +2 | −12 | 1070 |
| 59 | 1.0 | " | " | MnO$_2$ | 0.2 | 530 | 0.98 | 5×10$^{13}$ | +2 | −10 | 1040 |
| 33 | 1.0 | Ba | " | — | 0 | 550 | 2.24 | 4×10$^{13}$ | +2 | −13 | 1100 |
| 60 | 1.0 | " | " | MnO$_2$ | 0.2 | 545 | 1.12 | 5×10$^{13}$ | +2 | −12 | 1050 |
| 37 | 1.0 | Sr | (Nb 0.5, Sb 0.5) | — | 0 | 620 | 2.00 | 8×10$^{14}$ | +1 | −6 | 1100 |
| 61 | 1.0 | " | " | MnO$_2$ | 0.2 | 620 | 1.02 | 4×10$^{14}$ | +1 | −7 | 1050 |
| 38 | 1.0 | Pb | " | — | 0 | 630 | 2.02 | 4×10$^{14}$ | +0 | −8 | 1070 |
| 62 | 1.0 | " | " | MnO$_2$ | 0.2 | 632 | 1.03 | 5×10$^{14}$ | +0 | −9 | 1050 |
| 39 | 1.0 | Ba | " | — | 0 | 630 | 2.03 | 4×10$^{14}$ | +2 | −12 | 1100 |
| 63 | 1.0 | " | " | MnO$_2$ | 0.2 | 630 | 1.02 | 5×10$^{14}$ | +2 | −12 | 1050 |

EXAMPLE 4

This example illustrates the modified ceramic dielectric composition (2).

Using finely divided powders of bismuth trioxide (Bi$_2$O$_3$), titanium dioxide (TiO$_2$), strontium carbonate (SrCO$_3$), barium carbonate (BaCO$_3$), lead monoxide (PbO), tantalum pentoxide (Ta$_2$O$_5$), antimony pentoxide (Sb$_2$O$_5$), tungsten trioxide (WO$_3$) and molybdenum trioxide (MoO$_3$), various ceramic dielectric compositions were prepared and tested for their electrical and dielectric characteristics, in a manner similar to that set forth in Example 1. Resistivities are shown in Table IV.

Table IV

| Specimen No. | x=y | Me | R | | Additive [wt.%] | | Resistivity (ohm · cm) |
|---|---|---|---|---|---|---|---|
| | | | Nb | Ta | MoO$_3$ | WO$_3$ | |
| 25 | 1.0 | Sr | 0.5 | 0.5 | — | — | 2.0×10$^{15}$ |
| 64 | " | " | " | " | 0.1 | — | 4.0×10$^{15}$ |
| 65 | " | " | " | " | 0.2 | — | 5.5×10$^{15}$ |
| 66 | " | " | " | " | 0.3 | — | 6.0×10$^{15}$ |
| 67 | " | " | " | " | 0.5 | — | 7.0×10$^{15}$ |
| 68 | " | " | " | " | 0.6 | — | 7.0×10$^{15}$ |
| 12 | 0.4 | Sr | 1 | 0 | — | — | 5.0×10$^{13}$ |
| 69 | " | " | " | " | 0.1 | — | 8.5×10$^{13}$ |
| 70 | " | " | " | " | 0.2 | — | 1.2×10$^{14}$ |
| 71 | " | " | " | " | 0.3 | — | 1.4×10$^{14}$ |
| 72 | " | " | " | " | 0.5 | — | 1.5×10$^{14}$ |
| 73 | " | " | " | " | 0.6 | — | 1.5×10$^{14}$ |
| 10 | 2.0 | Sr | 0 | 1 | — | — | 9.0×10$^{12}$ |
| 74 | " | " | " | " | 0.1 | — | 1.7×10$^{13}$ |
| 75 | " | " | " | " | 0.2 | — | 2.3×10$^{13}$ |
| 76 | " | " | " | " | 0.3 | — | 2.7×10$^{13}$ |
| 77 | " | " | " | " | 0.5 | — | 3.2×10$^{13}$ |
| 78 | " | " | " | " | 0.6 | — | 3.2×10$^{13}$ |
| 79 | 1.0 | Sr | 0.5 | 0.5 | — | 0.2 | 5.5×10$^{15}$ |
| 80 | " | " | " | " | 0.1 | 0.1 | 6.0×10$^{15}$ |

Figure 6:
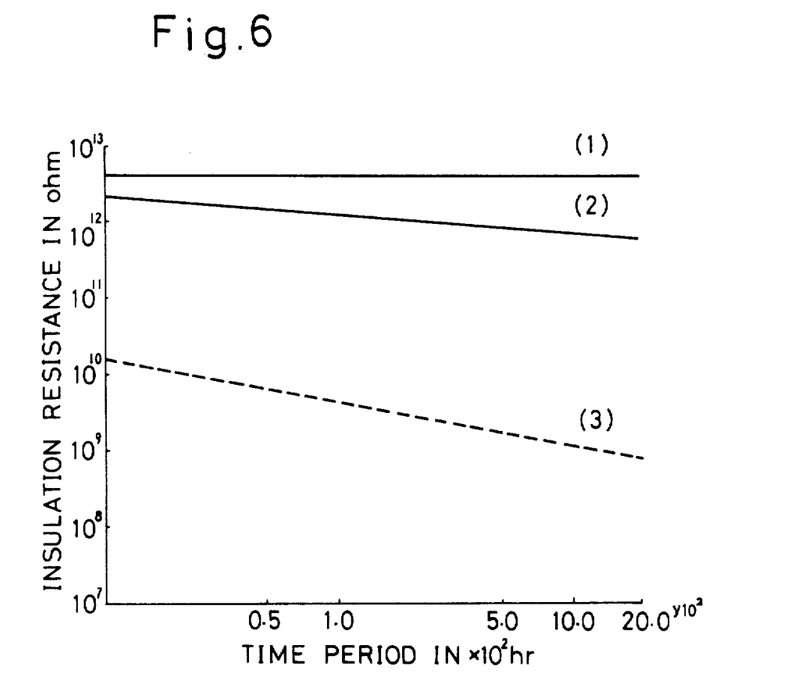
FIG. 6 is a chart illustrating the load-durability of insulation resistance of capacitors when exposed to a high temperature over a long period of time.

Using the ceramic dielectric compositions of specimen Nos. 25, 64 through 68, 79 and 80, ceramic laminar capacitors were manufactured in a manner similar to that in Example 2. The thickness of each of the ceramics in the laminar capacitors was 20 microns. The laminar capacitors were tested for their load-durability of insulation resistance at a high temperature. That is, the insulation resistance was measured before and after the laminar capacitors were maintained at 125° C for a period of 2,000 hours while a voltage of DC100V was applied thereto. Results are shown in Table V and FIG. 6, in which lines (1) and (2) indicate specimen Nos. 65 and 25, respectively.

For a comparison purpose, a known $BaTiO_3$-type ceramic laminar capacitor similar to that used in Example 2 was similarly tested. Results are shown by line (3) in FIG. 6.

Table V

| Specimen No. | Additive [wt.%] | | Insulation resistance (ohm) | |
|---|---|---|---|---|
| | $MoO_3$ | $WO_3$ | Initial | After 2,000 hours |
| 25 | — | — | $2.0 \times 10^{12}$ | $0.8 \times 10^{12}$ |
| 64 | 0.1 | — | $4.5 \times 10^{12}$ | $4.5 \times 10^{12}$ |
| 65 | 0.2 | — | $6.0 \times 10^{12}$ | $6.0 \times 10^{12}$ |
| 66 | 0.3 | — | $6.0 \times 10^{12}$ | $6.0 \times 10^{12}$ |
| 67 | 0.5 | — | $7.0 \times 10^{12}$ | $7.0 \times 10^{12}$ |
| 68 | 0.6 | — | $7.0 \times 10^{12}$ | $7.0 \times 10^{12}$ |
| 79 | — | 0.2 | $6.0 \times 10^{12}$ | $6.0 \times 10^{12}$ |
| 80 | 0.1 | 0.1 | $6.0 \times 10^{12}$ | $6.0 \times 10^{12}$ |

EXAMPLE 5

This example illustrates the modified ceramic dielectric composition (3).

Using finely divided powders of bismuth trioxide ($Bi_2O_3$), titanium dioxide ($TiO_2$), strontium carbonate ($SrCO_3$), barium carbonate ($BaCO_3$), lead monoxide (PbO), tantalum pentoxide ($Ta_2O_5$), niobium pentoxide ($Nb_2O_5$) and antimony pentoxide ($Sb_2O_5$), various ceramic dielectric compositions were prepared and tested for their electrical and dielectric characteristics, in a manner similar to that set forth in Example 1. Results are shown in Table VI.

Table VI

| Specimen No. | x=y | Amount of $PbTiO_3$ (mole) | Me | R | Dielectric constant $\epsilon_s$ | tan$\delta$ (%) | Resistivity (ohm . cm) | $\epsilon_s \cdot$ TC (%) (−55~125° C) | | Sintering temperature (° C) |
|---|---|---|---|---|---|---|---|---|---|---|
| 1* | 0 | 0 | — | — | 140 | 2.6 | $2 \times 10^{11}$ | | | 1200 |
| 3 | 0.4 | 0 | Sr | Ta | 200 | 1.2 | $3 \times 10^{13}$ | +12 | −6 | 1100 |
| 81 | 0.4 | 1.0 | " | " | 300 | 1.0 | $1 \times 10^{14}$ | +10 | −4 | 980 |
| 6 | 1.0 | 0 | " | " | 500 | 1.1 | $9 \times 10^{13}$ | +2 | −8 | 1100 |
| 82 | 1.0 | 1.0 | " | " | 540 | 0.5 | $1 \times 10^{14}$ | +0 | −6 | 980 |
| 83 | 1.0 | 2.0 | " | " | 550 | 0.5 | $1 \times 10^{14}$ | +0 | −4 | 980 |
| 84 | 1.0 | 2.5 | " | " | 520 | 1.5 | $4 \times 10^{13}$ | +0 | −4 | 1040 |
| 85 | 1.0 | 2.7 | " | " | 500 | 1.9 | $9 \times 10^{13}$ | | | 1200 |
| 25 | 1.0 | 0 | Sr | Nb 0.5 Ta 0.5 | 640 | 2.6 | $2 \times 10^{15}$ | +4 | −15 | 1100 |
| 86 | 1.0 | 0.05 | " | " | 640 | 2.6 | $2 \times 10^{15}$ | +4 | −15 | 1100 |
| 87 | 1.0 | 0.1 | " | " | 650 | 2.3 | $2 \times 10^{15}$ | +4 | −14 | 1070 |
| 88 | 1.0 | 0.3 | " | " | 680 | 1.6 | $2 \times 10^{15}$ | +4 | −13 | 1040 |
| 89 | 1.0 | 0.5 | " | " | 700 | 1.1 | $2 \times 10^{15}$ | +4 | −14 | 1010 |
| 90 | 1.0 | 1.0 | " | " | 750 | 0.9 | $2 \times 10^{15}$ | +1 | −12 | 950 |
| 91 | 1.0 | 1.5 | " | " | 780 | 0.8 | $9 \times 10^{14}$ | +1 | −10 | 1040 |
| 92 | 1.0 | 2.0 | " | " | 790 | 0.8 | $9 \times 10^{14}$ | +0 | −6 | 950 |
| 93 | 1.0 | 2.5 | " | " | 730 | 1.7 | $5 \times 10^{14}$ | +0 | −6 | 1100 |
| 94 | 1.0 | 2.7 | " | " | 650 | 2.4 | $4 \times 10^{14}$ | — | | 1200 |
| 95 | 1.0 | 6.0 | " | " | 510 | 2.0 | $8 \times 10^{13}$ | +0 | −10 | 1200 |
| 96 | 1.0 | 8.0 | " | " | 360 | 2.2 | $4 \times 10^{13}$ | +0 | −12 | 1200 |
| 97 | 1.0 | 10.0 | " | " | 230 | 2.4 | $1 \times 10^{13}$ | +5 | −10 | 1250 |
| 98* | 1.0 | 12.0 | " | " | 160 | 2.7 | $7 \times 10^{12}$ | +10 | −15 | 1260 |
| 24 | 1.0 | 0 | " | Nb 0.7 Ta 0.3 | 680 | 2.5 | $5 \times 10^{13}$ | +10 | 15 | 1100 |
| 99 | 1.0 | 1.0 | " | " | 800 | 0.9 | $5 \times 10^{14}$ | +8 | −8 | 950 |
| 100 | 1.0 | 2.0 | " | " | 840 | 0.8 | $5 \times 10^{14}$ | +4 | −10 | 950 |
| 27 | 1.0 | 0 | " | Nb 0.3 Ta 0.7 | 570 | 2.0 | $3 \times 10^{15}$ | +1 | −11 | 1100 |
| 101 | 1.0 | 1.0 | " | " | 750 | 0.6 | $4 \times 10^{14}$ | +0 | −8 | 950 |
| 102 | 1.0 | 2.0 | " | " | 860 | 0.5 | $4 \times 10^{14}$ | +0 | −4 | 950 |
| 14 | 1.0 | 0 | Sr | Nb | 600 | 2.5 | $4 \times 10^{13}$ | — | | 1100 |
| 103 | 1.0 | 1.0 | " | " | 810 | 1.0 | $3 \times 10^{14}$ | — | | 980 |
| 104 | 1.0 | 2.0 | " | " | 860 | 0.8 | $5 \times 10^{14}$ | +15 | −15 | 980 |
| 105 | 1.0 | 2.5 | " | " | 770 | 2.0 | $9 \times 10^{13}$ | — | | 1040 |
| 106 | 1.0 | 6.0 | " | " | 560 | 2.1 | $7 \times 10^{13}$ | — | | 1200 |
| 107 | 1.0 | 8.0 | " | " | 420 | 2.1 | $3 \times 10^{13}$ | — | | 1200 |
| 108 | 1.0 | 10.0 | " | " | 250 | 2.3 | $1 \times 10^{13}$ | — | | 1250 |
| 109 | 1.0 | 12.0 | " | " | 150 | 2.5 | $6 \times 10^{12}$ | — | | 1260 |
| 110 | 0.8 | 1.0 | Sr | Nb 0.5 Ta 0.5 | 750 | 1.2 | $2 \times 10^{14}$ | +2 | −8 | 950 |
| 111 | 1.4 | 1.0 | " | Ta | 400 | 0.2 | $1 \times 10^{14}$ | +2 | −2 | 980 |
| 112 | 2.0 | 1.0 | " | " | 200 | 0.2 | $3 \times 10^{14}$ | +0 | −4 | 980 |
| 113 | 1.0 | 1.0 | Pb | Nb 0.5 Ta 0.5 | 750 | 0.9 | $2 \times 10^{15}$ | +1 | −12 | 950 |
| 114 | 1.0 | 1.0 | Ba | " | 740 | 0.95 | $2 \times 10^{15}$ | +1 | −11 | 980 |
| 115 | 1.0 | 2.0 | " | " | 780 | 0.8 | $2 \times 10^{15}$ | +0 | −6 | 980 |
| 116 | 1.0 | 1.0 | Sr 0.5 Pb 0.5 | " | 740 | 0.9 | $3 \times 10^{15}$ | +1 | −12 | 950 |
| 117 | 1.0 | 10.0 | " | " | 235 | 2.2 | $1 \times 10^{13}$ | — | | 1250 |
| 118 | 1.0 | 1.0 | Sr 0.5 Ba 0.5 | " | 730 | 0.9 | $1 \times 10^{15}$ | +1 | −12 | 980 |
| 119 | 1.0 | 1.0 | Pb 0.5 Ba 0.5 | " | 740 | 0.9 | $2 \times 10^{15}$ | +1 | −11 | 980 |

Table VI-continued

| Specimen No. | x=y | Amount of PbTiO₃ (mole) | Me | R | Dielectric constant $\epsilon_r$ | tanδ (%) | Resistivity (ohm . cm) | $\epsilon_r \cdot$ TC (%) (−55~125° C) | Sintering temperature (° C) |
|---|---|---|---|---|---|---|---|---|---|
| 120 | 1.0 | 10.0 | " | " Nb 0.5 | 240 | 2.3 | $1 \times 10^{13}$ | — | 1250 |
| 121 | 1.0 | 1.0 | Sr | Sb 0.5 Ta 0.5 | 740 | 0.9 | $3 \times 10^{15}$ | + 0  − 6 | 950 |
| 122 | 1.0 | 1.0 | Pb | Sb 0.5 Nb 0.5 | 740 | 0.9 | $3 \times 10^{15}$ | + 0  − 8 | 950 |
| 123 | 1.0 | 1.0 | Ba | Sb 0.5 | 740 | 0.9 | $3 \times 10^{15}$ | + 2  −10 | 980 |

EXAMPLE 6

This example illustrates electrical characteristics of laminar capacitors manufactured from the modified ceramic dielectric composition (3).

Using the ceramic dielectric composition of specimen No. 90 set forth in Example 5, ceramic laminar capacitors were manufactured in a manner similar to that in Example 2 wherein an internal electrode composed of 80% of silver and 20% of palladium was used and the sintering temperature was 950° C. All other conditions remained substantially the same. The ceramic laminar capacitors were tested for their electrical characteristics. Results are shown in Table VII. For comparison purposes, the comparative data shown in Table II are again shown in Table VII.

thickness and of 20 micron thickness, respectively. Further, it exhibits an insulation resistance larger than those of known capacitors even when the ceramics are of 20 micron thickness.

Further, it was proved that the dependence of the capacity upon the temperature variations was only from +1% to −12% over the temperature range from −55° to +125° C. This is similar to $\epsilon_r$ TC shown in Table VI.

EXAMPLE 7

This example illustrates the modified ceramic dielectric composition (4).

Using finely divided powders of bismuth trioxide (Bi₂O₃), titanium dioxide (TiO₂), strontium carbonate (SrCO₃), barium carbonate (BaCO₃), lead monoxide (PbO), tantalum pentoxide (Ta₂O₅), niobium pentoxide Table VII

| Ceramics Electrical characteristics | Thickness of ceramics | | | | Internal electrode | Sintering temperature (° C) |
|---|---|---|---|---|---|---|
| | 50 microns | | 20 microns | | | |
| | Insulation resistance (ohm) | $V_{BD}$ (V) | Insulation resistance (ohm) | $V_{BD}$ (V) | | |
| Specimen No. 90 | $5 \times 10^{13}$ | 3500 | $1 \times 10^{13}$ | 1200 | Ag:80 Pd:20 | 950 |
| Crystalline glass | $1.4 \times 10^{11}$ | 300 | — | — | Au Pt:70 | 1000 |
| BaTiO-type ceramics | $1.0 \times 10^{10}$ | 200 | — | — | Pd:30 | 1370 |

As seen from Table VII, a laminar capacitor prepared from the ceramic dielectric composition of the invention exhibits DC breakdown voltages approximately ten times and five times as large as those of known laminar capacitors when the dielectric layers are of 50 micron (Nb₂O₅), antimony pentoxide (Sb₂O₅), molybdenum trioxide (MoO₃) and tungsten trioxide (WO₃), various ceramic dielectric compositions were prepared and tested for their resistivity, in a manner similar to that set forth in Example 1. Results are shown in Table VIII.

Table VIII

| Specimen NO. | x=y | Amount of PbTiO₃ (mole)³ | Me | Nb | Ta | Additive (wt.%) | | Resistivity (ohm · cm) |
|---|---|---|---|---|---|---|---|---|
| | | | | | | MoO₃ | WO₃ | |
| 25 | 1.0 | 0.1 | Sr | 0.5 | 0.5 | — | — | $2.0 \times 10^{15}$ |
| 124 | " | " | " | " | " | 0.1 | — | $4.5 \times 10^{15}$ |
| 125 | " | " | " | " | " | 0.2 | — | $6.0 \times 10^{15}$ |
| 126 | " | " | " | " | " | 0.3 | — | $6.7 \times 10^{15}$ |
| 127 | " | " | " | " | " | 0.5 | — | $7.0 \times 10^{15}$ |
| 128 | " | " | " | " | " | 0.6 | — | $7.0 \times 10^{15}$ |
| 91 | 1.0 | 1.5 | Sr | 0.5 | 0.5 | — | — | $9.0 \times 10^{14}$ |
| 129 | " | " | " | " | " | 0.1 | — | $1.7 \times 10^{15}$ |
| 130 | " | " | " | " | " | 0.2 | — | $2.3 \times 10^{15}$ |
| 131 | " | " | " | " | " | 0.3 | — | $2.7 \times 10^{15}$ |
| 132 | " | " | " | " | " | 0.5 | — | $3.0 \times 10^{15}$ |
| 133 | " | " | " | " | " | 0.6 | — | $3.0 \times 10^{15}$ |
| 93 | 1.0 | 2.5 | Sr | 0.5 | 0.5 | — | — | $5.0 \times 10^{14}$ |
| 134 | " | " | " | " | " | — | 0.1 | $9.5 \times 10^{14}$ |
| 135 | " | " | " | " | " | — | 0.2 | $1.3 \times 10^{15}$ |
| 136 | " | " | " | " | " | — | 0.3 | $1.5 \times 10^{15}$ |
| 137 | " | " | " | " | " | — | 0.5 | $1.7 \times 10^{15}$ |
| 138 | " | " | " | " | " | — | 0.6 | $1.7 \times 10^{15}$ |
| 95 | 1.0 | 6.0 | Sr | 0.5 | 0.5 | — | — | $8.0 \times 10^{13}$ |
| 139 | " | " | " | " | " | 0.1 | — | $1.2 \times 10^{14}$ |
| 140 | " | " | " | " | " | 0.5 | — | $2.1 \times 10^{14}$ |
| 141 | " | " | " | " | " | 0.6 | — | $2.1 \times 10^{14}$ |
| 97 | 1.0 | 10.0 | " | " | " | — | — | $1.0 \times 10^{13}$ |
| 142 | " | " | " | " | " | 0.1 | — | $1.4 \times 10^{13}$ |

Table VIII-continued

| Specimen NO. | Amount of PbTiO$_3$ | | | R | | Additive (wt.%) | | Resistivity (ohm·cm) |
|---|---|---|---|---|---|---|---|---|
| | x=y | (mole) | Me | Nb | Ta | MoO$_3$ | WO$_3$ | |
| 143 | " | " | " | " | " | 0.5 | — | $2.2 \times 10^{13}$ |
| 144 | " | " | " | " | " | 0.6 | — | $2.2 \times 10^{13}$ |
| 98* | " | 12.0 | " | " | " | — | — | $7.0 \times 10^{12}$ |
| 145* | " | " | " | " | " | 0.1 | — | $8.6 \times 10^{12}$ |
| 146* | " | " | " | " | " | 0.5 | — | $1.3 \times 10^{13}$ |
| 147* | " | " | " | " | " | 0.6 | — | $1.3 \times 10^{13}$ |

EXAMPLE 8

This example illustrates the ceramic dielectric compositions wherein x and y are not equal to each other.

Following the procedures set forth in Example 1 and 5, various ceramic dielectric compositions were prepared and tested for their dielectric characteristics. Results are shown in Table X.

Table X

| Specimen No. | x (y=1.0) | Bi/Me (by mole) | Me | R | PbTiO$_3$ (mole) | $\epsilon_s$ | tan δ (%) | $\epsilon_s$·TC(%) (−55°C~125°C) |
|---|---|---|---|---|---|---|---|---|
| 166* | 1.0 | 3.45 | Sr | Nb 0.5 / Ta 0.5 | — | 640 | | +0 | −20 |
| 167 | 1.0 | 3.3 | " | " | — | 650 | | +2 | −14 |
| 25 | 1.0 | 3.0 | " | " | — | 650 | | +4 | −15 |
| 168 | 1.0 | 2.7 | " | " | — | 660 | | +4 | −17 |
| 169* | 1.0 | 2.55 | " | " | — | 630 | | +2 | −21 |
| 170* | 1.15 | 2.6 | " | " | — | 600 | 4.4 | | |
| 171 | 1.1 | 2.7 | " | " | — | 690 | 3.0 | | |
| 25 | 1.0 | 3.0 | " | " | — | 650 | 2.6 | | |
| 172 | 0.9 | 3.3 | " | " | — | 630 | 2.1 | | |
| 173* | 0.85 | 3.5 | " | " | — | 490 | 1.5 | | |
| 174 | 1.1 | 2.7 | Ba | " | — | 690 | 3.0 | | |
| 175 | 1.1 | 2.7 | Pb | " | — | 685 | 2.9 | | |
| 176* | 1.0 | 3.45 | Sr | " | 1.0 | 760 | | +0 | −17 |
| 177 | 1.0 | 3.3 | " | " | 1.0 | 760 | | +2 | −14 |
| 90 | 1.0 | 3.0 | " | " | 1.0 | 750 | 0.9 | +1 | −12 |
| 178 | 1.0 | 2.7 | " | " | 1.0 | 770 | | +1 | −15 |
| 179* | 1.0 | 2.55 | " | " | 1.0 | 710 | | +0 | −18 |
| 180* | 1.15 | 2.6 | " | " | 1.0 | 700 | 3.0 | | |
| 181 | 1.1 | 2.7 | " | " | 1.0 | 800 | 1.4 | | |
| 90 | 1.0 | 3.0 | " | " | 1.0 | 750 | 0.9 | +1 | −12 |
| 182 | 0.9 | 3.3 | " | " | 1.0 | 700 | 0.9 | | |
| 183* | 0.85 | 3.5 | " | " | 1.0 | 580 | 0.8 | | |
| 184 | 1.1 | 2.7 | Ba | " | 1.0 | 800 | 1.4 | | |
| 185 | 1.1 | 2.7 | Pb | " | 1.0 | 790 | 1.3 | | |

Following the procedures set forth in Examples 1 and 5, various ceramic dielectric compositions were prepared and tested for their dielectric characteristics. Results are shown in Table IX.

EXAMPLE 10

This example illustrates the ceramic dielectric compositions wherein the relative amount of titanium to R is varied.

Table IX

| Specimen No. | x | y | Me | R | PbTiO$_3$ (mole) | $\epsilon_s$ | tan δ (%) | $\epsilon_s$·TC(%) (−55° ~ 125°C) |
|---|---|---|---|---|---|---|---|---|
| 148* | 0.85 | 1.0 | Sr | Nb 0.5 / Ta 0.5 | — | 620 | 1.9 | +0 | −25 |
| 149 | 0.90 | 1.0 | " | " | — | 680 | 2.2 | +3 | −16 |
| 25 | 1.00 | 1.0 | " | " | — | 640 | 2.6 | +4 | −15 |
| 150 | 1.10 | 1.0 | " | " | — | 630 | 2.9 | +5 | −12 |
| 151* | 1.15 | 1.0 | " | " | — | 620 | 4.5 | +5 | −12 |
| 152* | 1.00 | 0.85 | " | " | — | 600 | 1.5 | +0 | −25 |
| 153 | 1.00 | 0.90 | " | " | — | 610 | 2.0 | +1 | −16 |
| 154 | 1.00 | 1.10 | " | " | — | 630 | 2.8 | +4 | −16 |
| 155* | 1.00 | 1.15 | " | " | — | 590 | 3.3 | +4 | −25 |
| 156 | 0.90 | 1.0 | Ba | " | — | 680 | 2.2 | +3 | −16 |
| 157 | 0.90 | 1.0 | Pb | " | — | 675 | 2.2 | +3 | −15 |
| 158* | 0.85 | 1.0 | Sr | " | 1.0 | 700 | 0.7 | +2 | −18 |
| 159 | 0.90 | 1.0 | " | " | 1.0 | 790 | 0.8 | +2 | −13 |
| 90 | 1.0 | 1.0 | " | " | 1.0 | 750 | 0.9 | +1 | −12 |
| 160 | 1.10 | 1.0 | " | " | 1.0 | 740 | 2.0 | +1 | −12 |
| 161* | 1.15 | 1.0 | " | " | 1.0 | 710 | 3.0 | +1 | −12 |
| 162* | 1.00 | 0.85 | " | " | 1.0 | 700 | 0.6 | +0 | −18 |
| 163 | 1.00 | 0.90 | " | " | 1.0 | 720 | 0.9 | +1 | −12 |
| 164 | 1.00 | 1.10 | " | " | 1.0 | 730 | 1.2 | +2 | −13 |
| 165* | 1.00 | 1.15 | " | " | 1.0 | 680 | 2.8 | +4 | −18 |

EXAMPLE 9

This example illustrates the ceramic dielectric compositions wherein the relative amount of bismuth to Me is varied.

Following the procedures set forth in Examples 1 and 5, various ceramic dielectric compositions were prepared and tested for their dielectric characteristics. Results are shown in Table XI.

Table XI

| Specimen No. | y (x=1.0) | Ti/R (by mole) | Me | R | PbTiO₃ (mole) | $\epsilon_s$ | tan δ (%) | $\epsilon_s \cdot$ TC (%) (−55° ~ 125° C) | |
|---|---|---|---|---|---|---|---|---|---|
| 186* | 1.0 | 2.3 | Sr | Nb 0.5 | — | 600 | 4.0 | +4 | −25 |
| 187 | 1.0 | 2.2 | " | Ta 0.5 | — | 650 | 3.0 | +4 | −16 |
| 25 | 1.0 | 2.0 | " | " | — | 650 | 2.6 | +4 | −15 |
| 188 | 1.0 | 1.8 | " | " | — | 630 | 2.0 | +4 | −18 |
| 189* | 1.0 | 1.7 | " | " | — | 600 | 1.5 | +5 | −25 |
| 190* | 1.15 | 1.7 | " | " | — | 750 | 4.2 | +2 | −30 |
| 191 | 1.1 | 1.8 | " | " | — | 700 | 2.9 | +3 | −18 |
| 25 | 1.0 | 2.0 | " | " | — | 650 | 2.6 | +4 | −15 |
| 192 | 0.9 | 2.2 | " | " | — | 600 | 2.0 | +2 | −13 |
| 193* | 0.85 | 2.4 | " | " | — | 490 | 1.6 | +2 | −12 |
| 194* | 1.0 | 2.3 | " | " | 1 | 710 | 3.0 | +2 | −17 |
| 195 | 1.0 | 2.2 | " | " | 1 | 750 | 1.5 | +1 | −14 |
| 90 | 1.0 | 2.0 | " | " | 1 | 750 | 0.9 | +1 | −12 |
| 196 | 1.0 | 1.8 | " | " | 1 | 740 | 1.0 | +2 | −13 |
| 197* | 1.0 | 1.7 | " | " | 1 | 700 | 0.9 | +2 | −18 |
| 198* | 1.15 | 1.7 | " | " | 1 | 850 | 3.1 | +0 | −20 |
| 199 | 1.1 | 1.8 | " | " | 1 | 810 | 1.9 | +0 | −14 |
| 90 | 1.0 | 2.0 | " | " | 1 | 750 | 0.9 | +1 | −12 |
| 200 | 0.9 | 2.2 | " | " | 1 | 710 | 0.8 | +1 | −12 |
| 201* | 0.85 | 2.4 | " | " | 1 | 600 | 0.6 | +2 | −11 |

What we claim is:

1. A ceramic dielectric composition consisting essentially of (1) bismuth titanate with substituents, expressed by the formula:

$$Bi_{4-x}Me_xTi_{3-y}R_yO_{12}$$

where Me is at least one divalent metal selected from the group consisting of strontinum, barium and lead, R is at least one pentavalent metal selected from the group consisting of tantalum, niobium and antimony, and both x and y are numbers falling within the range of 0.4 to 2.0 and the ratio of x/y is within the range of 0.9 to 1.1, and; (2) at least one metal oxide selected from the group consisting of tungsten oxide and molybdenum oxide in an amount of 0.01 to 2.0% by weight based on the weight of the aforesaid component (1) of the formula $Bi_{4-y}Me_xTi_{3-y}R_yO_{12}$ and expressed in terms of the amount of tungsten trioxide (WO₃) and molybdenum trioxide (MoO₃), respectively.

2. A ceramic dielectric composition according to claim 1 wherein x and y are numbers falling within the range of 0.8 to 1.4.

3. A ceramic dielectric composition according to claim 1 wherein Me is strontium and R is a combination of niobium and tantalum.

4. A cermic dielectric composition according to claim 1 wherein the amount of said metal oxide is 0.01 to 0.5% by weight.

5. A ceramic dielectric composition consisting essentially of: (1) bismuth titanate with substituents, expressed by the formula:

$$Bi_{4-x}Me_xTi_{3-y}R_yO_{12}$$

where Me is at least one divalent metal selected from the group consisting of strontium, barium and lead, R is at least one pentavalent metal selected from the group consisting of tantalum, niobium and antimony, and both x and y are positive numbers falling within the range of 0.4 to 2.0 and the ratio of x/y is within the range of 0.9 to 1.1; (2) at least one metal oxide selected from tungsten oxide and molybdenum oxide in an amount of 0.01 to 2.0% by weight based on the weight of the aforesaid component (1) and expressed in terms of the amount of tungsten trioxide (WO₃) and molybdenum trioxide (MoO₃), respectively, and; (3) 0.1 to 10.0 moles of lead titanate per mole of the aforesaid component (1).

6. A ceramic dielectric composition according to claim 5 wherein x and y are numbers falling within the range of 0.8 to 1.4.

7. A ceramic dieletric composition according to claim 5 wherein Me is strontium and R is a combination of niobium and tantalum.

8. A ceramic dielectric composition according to claim 5 wherein the amount of lead titanate is 0.1 to 2.5 moles per mole of said component (1).

9. A ceramic dielectric composition according to claim 5 wherein the amount of said metal oxide is 0.01 to 0.5% by weight.

* * * * *